(12) United States Patent
Kehoe et al.

(10) Patent No.: US 6,726,871 B2
(45) Date of Patent: Apr. 27, 2004

(54) METHOD AND APPARATUS FOR ATTACHMENT OF AIR CLEANER HOUSING

(75) Inventors: Jon-David Kehoe, Belle River (CA); Brian Maurice Marcus, Chatham (CA)

(73) Assignee: Siemens VDO Automotive, Inc., Chatham (CA)

( * ) Notice: Subject to any disclaimer, the term of this patent is extended or adjusted under 35 U.S.C. 154(b) by 33 days.

(21) Appl. No.: 10/147,375

(22) Filed: May 16, 2002

(65) Prior Publication Data

US 2002/0185102 A1 Dec. 12, 2002

Related U.S. Application Data

(60) Provisional application No. 60/296,657, filed on Jun. 7, 2001.

(51) Int. Cl.[7] .............................................. B29C 45/26
(52) U.S. Cl. ....................... 264/328.1; 425/577; 249/63
(58) Field of Search .............................. 264/318, 328.1; 425/577; 249/63, 64; 55/385.3, DIG. 3

(56) References Cited

U.S. PATENT DOCUMENTS

| | | | | |
|---|---|---|---|---|
| 3,796,027 A | * | 3/1974 | Gumtow | ................ 55/DIG. 28 |
| 4,386,949 A | * | 6/1983 | Bassi | ..................... 55/DIG. 28 |
| 5,049,274 A | * | 9/1991 | Leason et al. | ............... 210/445 |
| 5,212,853 A | * | 5/1993 | Kaneko | ........................ 24/452 |
| 6,032,834 A | * | 3/2000 | Keung | ..................... 264/328.1 |
| 6,235,073 B1 | * | 5/2001 | Bannister et al. | ........... 55/385.3 |
| 6,342,286 B1 | * | 1/2002 | Hollingshead et al. | ....... 264/241 |

* cited by examiner

*Primary Examiner*—Jill L. Heitbrink

(57) ABSTRACT

An injection molded component includes a plurality of integrally formed push pins that provide a simplified attachment interface for attaching the component to a vehicle structure. The injection molded component includes a base housing component with an upper and lower surfaces. Each pin extends out from the lower surface of the base housing component to a distal end. A plurality of radially extending flanges is formed about the circumference of the distal end. The flanges are spaced apart from one another and form a retention feature that is inserted into an appropriate vehicle structural component to secure the base housing component to the vehicle. The formation of flanges on the pins eliminates the need for additional injection mold tooling actions to further form the attachment interface.

6 Claims, 2 Drawing Sheets

METHOD AND APPARATUS FOR ATTACHMENT OF AIR CLEANER HOUSING

CROSS-REFERENCE TO RELATED APPLICATIONS

The application claims priority to U.S. Provisional Application No. 60/296,657, which was filed on Jun. 7, 2001.

BACKGROUND OF THE INVENTION

This invention relates to a method and apparatus for providing an attachment feature on an injection molded component without requiring any additional injection mold tooling actions to further form the attachment feature.

Injection molded components are used in a variety of different applications in a vehicle. An example of one injection molded component is an air cleaner housing. In the past air cleaner housings have been installed into the vehicle by using separate push pin members and a grommet. The push pins are inserted into openings in a base portion of the air cleaner housing and are then pushed into a grommet that is mounted to a vehicle structure. This process is labor intensive and time consuming.

One proposed solution has been to incorporate the details of the push pin directly into the housing by molding pin attachment features into the base of the air cleaner housing. This current process requires extensive injection mold tool actions to form pin attachment features. These mold actions include slide actions and/or running the parting line around the particular feature to create an undercut that retains the grommet. Such additional tooling actions increase the overall cost of the component.

Thus, it is desirable to have an attachment feature that can easily be molded into an injection molded component without requiring extensive injection mold tooling actions, as well as overcoming the other above mentioned deficiencies with the prior art.

SUMMARY OF THE INVENTION

A retaining assembly is used to attach an injection molded component to a vehicle structure. The molded component includes a base portion defining a bottom surface having at least one attachment member for attachment to a vehicle structural component. The attachment member is integrally formed as one piece with the base portion such that there is a continuous unbroken surface extending between the base portion and attachment member. The attachment member is formed as a cylindrical body portion that extends to a distal end having a retention member that cooperates with the vehicle structure component to retain the molded component to the vehicle structure.

The retention member is formed with a plurality flanges spaced apart from one another and which extend out radially from the cylindrical body portion.

Preferably, the injection molded component is an air cleaner housing and the retention members are integrally formed push pins. The push pins are inserted through a grommet or other similar component to attach the housing to the appropriate vehicle structure.

In one disclosed embodiment, a pad is formed about at least a portion of the cylindrical body portion by a lower mold portion. The base portion of the component further defines a top surface that faces opposite from the bottom surface, and which includes at least one opening extending through the base portion from the top surface to the bottom surface adjacent the cylindrical body portion. The opening receives an upper mold portion, which is positioned at a predetermined distance apart from the lower mold portion. The flange is formed between the upper and lower mold portions.

The method of forming an air cleaner housing component includes the following steps. An upper mold defines a top surface of the air cleaner housing component and includes at least one transversely extending male member defining a portion of the attachment member. A lower mold defines a bottom surface of the air cleaner housing component and includes at least one female member defining a portion of the attachment member. The upper mold is positioned relative to the lower mold by inserting the male member into the female member. The upper mold and male member are held at a predetermined distance apart from the lower mold and female member to define a gap that defines the shape of the air cleaner housing component. Material is injected into the gap to integrally form the attachment member and air cleaner housing component as a single piece. Preferably, a plurality of flanges is formed at a distal end of the attachment members between the upper and lower molds.

The subject apparatus and method provide an attachment interface for an injection molded component that eliminates the need for additional injection mold tool actions, resulting in reduced costs and installation time. These and other features of the present invention can be best understood from the following specifications and drawings, the following of which is a brief description.

DETAILED DESCRIPTION OF A PREFERRED EMBODIMENT

Figure 1:
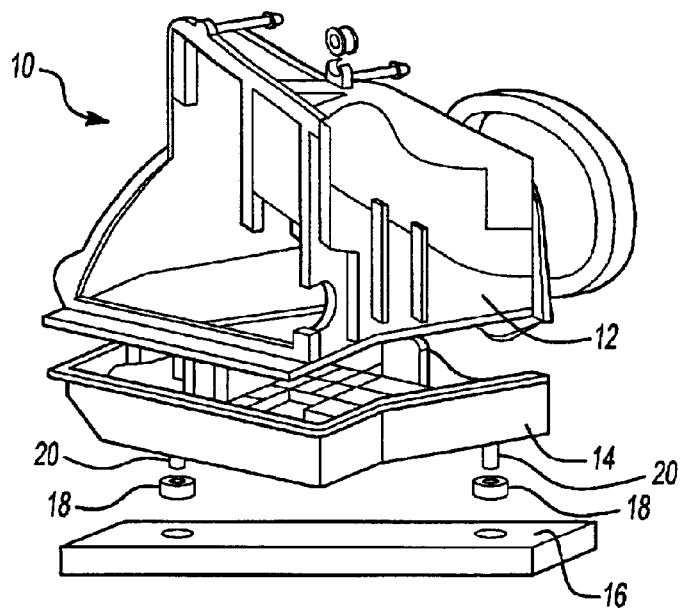
FIG. 1 is an exploded view of an air cleaner housing incorporating the subject invention.

An air cleaner housing is shown generally at 10 in FIG. 1. The air cleaner housing includes a main housing portion 12 and a base housing portion 14 that mounts to a vehicle structure 16, such as a frame member or other vehicle component. Grommets 18 or other similar members are also preferably included in mounting the base housing portion 14 to the vehicle structure 16 as is known in the art. The main 12 and base 14 housing portions are components formed by injection molding processes.

Figure 2:
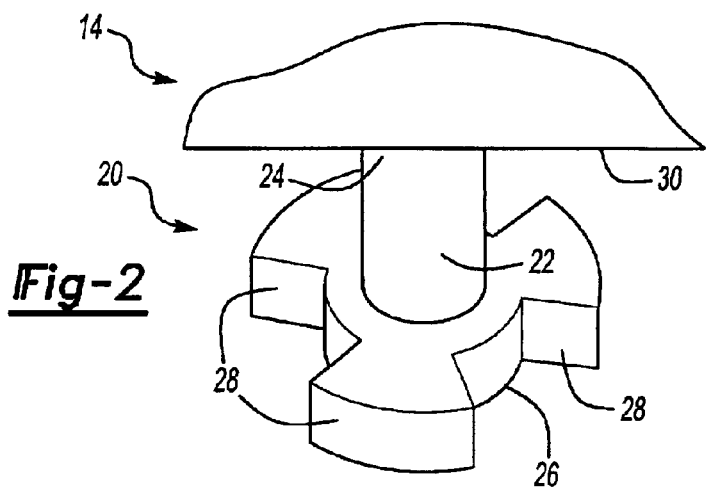
FIG. 2 is a perspective view, partially cut-away, of one attachment member incorporating the subject invention.

A plurality of attachment members 20 are integrally formed as one piece with the base housing portion 14 during the injection molding process. This will be discussed in further detail below. The number of attachment members 20 can vary depending on the size of the air cleaner housing 10 and the type of vehicle structure 16 that the air cleaner housing is being mounted to. An enlarged view of one of the attachment members is shown in FIG. 2. It should be understood that all attachment members 20 are formed in a similar manner as that which will be discussed below.

As shown in FIG. 2, the attachment member 20 and base housing portion 14 are formed as a single piece. The attachment member 20 includes a cylindrical body portion 22 that extends from a base end 24 to a distal end 26. A plurality of radially extending flanges 28 are formed on the distal end 26. Preferably three (3) flanges are formed that are spaced approximately ninety degrees apart from one another. While this is the preferred configuration, it should be understood that more or less flanges 28 could be formed at the distal end 26 with varying spacing patterns. The flanges 28 form a retainer head portion that is pushed or snapped into the grommets 18 and/or vehicle structure 16 to retain the air cleaner housing 10 in the vehicle.

The attachment members 20 extend outwardly from a bottom surface 30 on the bottom housing portion 14. The attachment members 20 are orientated transversely to the bottom surface 30 and are preferably perpendicular to the bottom surface 30. This provides for easy installation by applying a single vertical force to push the attachment members 20 into the vehicle structure 16.

Figure 3:
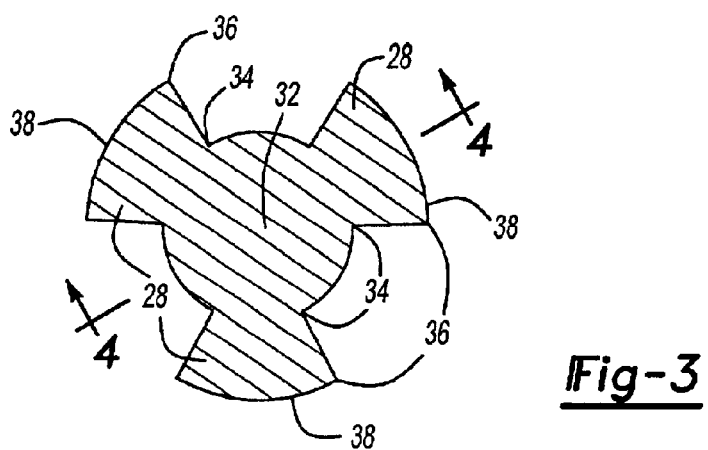
FIG. 3 is a cross-section of the attachment member shown in FIG. 2.

A cross-section of the retainer head portion of the attachment member 20 is shown in FIG. 3. The cylindrical body portion 22 defines a center 32 with the flanges 28 extending out radially away from the center 32. Each of the flanges 28 has a base 34 that extends out to a tip 36. Preferably, the flanges 28 are narrower at the base 34 than at the tip 36. The tips 36 preferably form an arcuate surface 38. The arcuate surface 38 facilitates push in force and helps accommodate for any mis-alignments between mating components.

Figure 4:
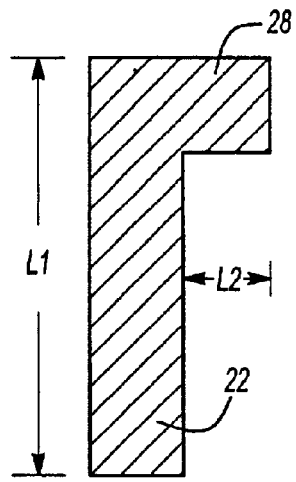
FIG. 4 is a cross-section taken along lines 4—4 in FIG. 3.

As shown in FIG. 4, each of the flanges 28 is orientated transversely to the cylindrical body portion 22. Further the cylindrical body portion 22 is preferably greater in length L1 than the length L2 of the flange 28.

Figure 5:
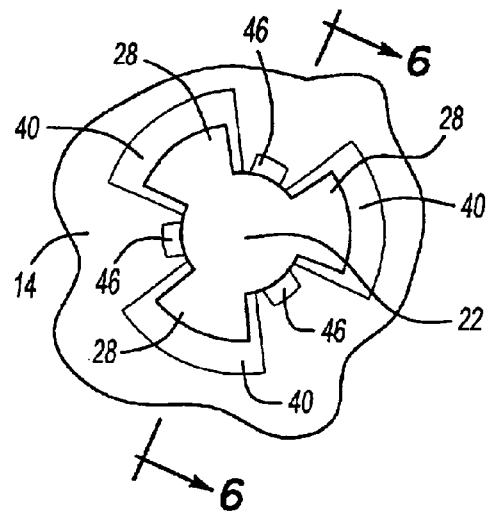
FIG. 5 is a bottom view of the attachment member and base component shown in FIG. 2.
Figure 6:
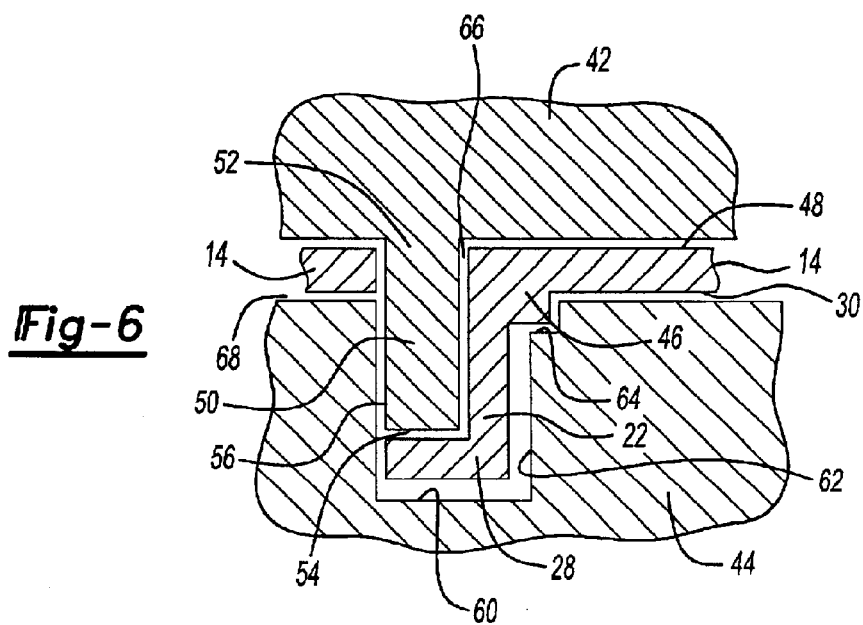
FIG. 6 is a cross-section taken along lines 6—6 of FIG. 5.

As shown in FIG. 5, recesses or pockets 40 are formed within the base housing portion 14 to allow the flanges 28 to be formed between an upper mold half 42 and a lower mold half 44 (FIG. 6). A raised pad portion 46 is also integrally formed about the cylindrical body portion 22 of the attachment member 20 during the molding process. The pad portion 46 cooperates with the grommets 18 and/or vehicle structure 16 to accommodate varying grommet heights.

The formation of the flanges 28 between the upper 42 and lower 44 molds is shown in FIG. 6. The base housing portion 14 includes a bottom surface 30 and an opposing top surface 48. The upper mold 42 has a profile that defines the contours of the top surface 48 of the base housing portion 14. The lower mold 44 has a profile that defines the contours of the bottom surface 30.

The upper mold 42 includes a male member 50 that extends from a base 52 to a distal end surface 54 with a male sidewall portion 56 extending between the base 52 and end surface 54. The lower mold 44 includes a female member 58 defining a bottom face 60 with a female wall portion 62 extending upwardly from the bottom face 60 of the molds 42, 44. The flanges 28 are formed between the distal end surface 54 and the bottom face 60.

Material, such as plastic, is injected between the upper 42 and lower 44 molds to form the base housing portion 14. Preferably, the male member 50 is non-concentrically positioned within the female member 58 such that the material does not completely surround the male member 50. Thus, the cylindrical body portion 22 is formed between the male sidewall portion 56 and the female walled portion 62 at one side of the male member 50.

The lower mold 44 includes a groove 64 or other similar formation that forms the pad portion 46. As shown in FIG. 6, a continuous unbroken surface extends from the bottom surface 30 of the base housing component 14 to the pad portion 46, to the cylindrical body portion 22, and finally to the flange 28.

An opening 66 that extends through the base housing portion 14 from the top surface 48 to the bottom surface 30 provides the clearance for the male member 50 of the upper mold 42 to make the undercut flange 28. No further mold tooling actions are required to form the attachment members 20. Once the mold halves 42, 44 are separated, the attachment members 20 can be pushed into place.

The method for forming the attachment members 20 and base housing portion 14 as a single piece includes the following steps. The upper mold 42 is positioned relative to the lower mold 44 by inserting the male member 50 into the female member 58. The upper mold 42 and male member 50 are held at a predetermined distance apart from the lower mold 44 and female member 58 to define a gap 68 that defines the shape of the base housing component 14. The material is injected into the gap 68 by means well known in the art to integrally form the attachment member 20 and base housing component 14 as a single piece. The distal end surface 54 is positioned apart from the bottom face 60 by a first predetermined distance, and male sidewall 56 is held apart from the female walled portion 62 by a second predetermined distance. The flanges 28 are formed between the distal end surface 54 and bottom face 60 to a predetermined thickness defined by the first predetermined distance and the cylindrical body portion 22 is formed between the female wall 62 and male 56 sidewall portions.

The subject method and apparatus provides an attachment feature that can easily be molded into an injection molded component without requiring extensive injection mold tooling actions. This reduces cost and simplifies installation procedures. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of forming an air cleaner housing component comprising the steps of:
   (a) providing an upper mold defining a top surface of the air cleaner housing component and including at least one transversely extending male member defining a portion of an attachment member for attaching the air cleaner housing component to a vehicle structure;
   (b) providing a lower mold defining a bottom surface of the air cleaner housing component and including at least one female member defining a portion of the attachment member;
   (c) positioning the upper mold relative to the lower mold by inserting the male member into the female member;
   (d) positioning the upper mold and male member at a predetermined distance apart from the lower mold and female member to define a gap that defines the shape of the air cleaner housing component;
   (e) injecting material into the gap to integrally form the attachment member and air cleaner housing component as a single piece.

2. A method as set forth in claim 1 further including the step of positioning the male member in a non-concentric relationship to the female member such that the material cannot completely surround the male member during step (d).

3. A method as set forth in claim 1 wherein the attachment member includes a cylindrical body portion extending to a distal end and further including the step of forming a plurality of radially extending flanges on the distal end of the attachment member.

4. A method as set forth in claim 3 further including the step of forming three flanges spaced apart from each other by approximately ninety degrees.

5. A method as set forth in claim 3 wherein the male member includes a base that extends to a distal end surface with a sidewall portion extending between the base and distal end surface and wherein the female member includes a female wall portion that extends downward to a bottom face and further including the steps of positioning the distal end surface apart from the bottom face by a first predetermined distance, positioning the sidewall portion apart from the female wall portion by a second predetermined distance, forming the flanges between the distal end surface and bottom face, and forming the cylindrical body portion between the female wall and sidewall portions.

6. A method as set forth in claim 3 further including the step of integrally forming a pad portion about at least a portion of the cylindrical body portion.

* * * * *